March 15, 1932.   L. F. KENNEDY   1,849,838
PROTECTIVE ARRANGEMENT
Filed Sept. 2, 1930
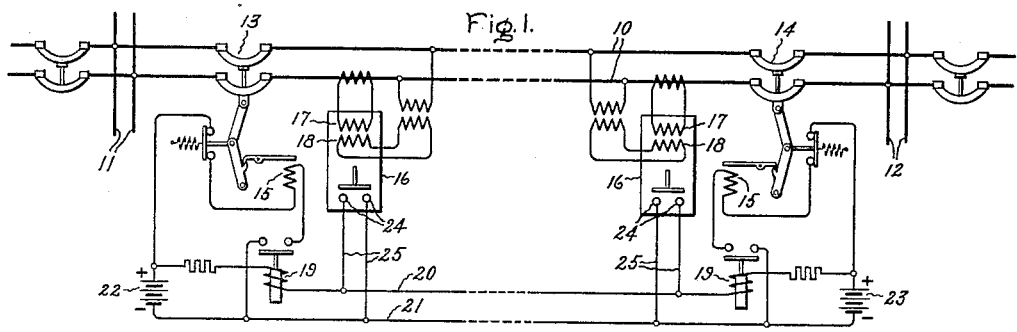
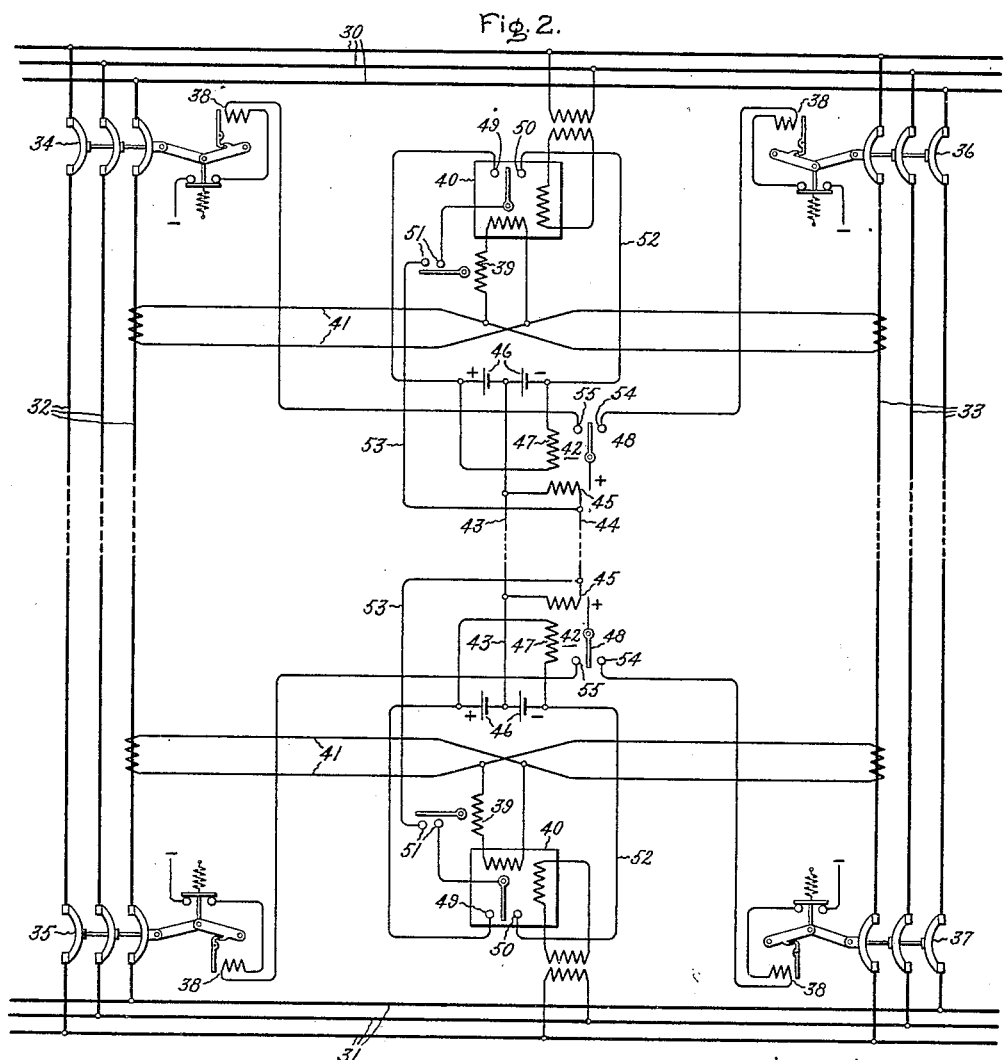
Inventor:
Luke F. Kennedy,
by Charles E. Tullar
His Attorney.

Patented Mar. 15, 1932

1,849,838

UNITED STATES PATENT OFFICE

LUKE F. KENNEDY, OF PHILADELPHIA, PENNSYLVANIA, ASSIGNOR TO GENERAL ELECTRIC COMPANY, A CORPORATION OF NEW YORK

PROTECTIVE ARRANGEMENT

Application filed September 2, 1930. Serial No. 479,388.

My invention relates to improvements in protective arrangements for electric systems and more particularly to improvements in protective arrangements wherein fault responsive protection means are located at a plurality of more or less widely separated points of an electric system for selectively isolating a section of the system included within said points on the occurrence of a fault on said section. An object of my invention is to provide an improved protective arrangement for quickly isolating a faulty section of an electric system in response to the functioning of the protective means which operates first, such that only one channel of communication is necessary between the ends of the section to be protected.

In order to avoid unstable system conditions on the occurrence of faults, it is necessary to isolate a faulty section as quickly as possible. Inasmuch as the protective apparatus at one point of a faulty section may operate much more quickly than that at another point, depending for example on the fault location, it is desirable to take advantage of the functioning of the protective apparatus which operates first to disconnect the section at two or more points in the shortest possible time. This introduces a space factor which requires a channel of communication between the more or less distant points. This channel of communication may consist of auxiliary conductors between the points. The expense of auxiliary conductors is frequently so high as to be prohibitive. Moreover, where such conductors are available for renting, they have to be rented in pairs. In accordance with my invention, it is possible to obtain the desired selective action by means of a single channel of communication. This channel may include two conductors or even one conductor with a ground return. Thus, there may be used any available wiring or wiring installed for the purpose of connecting the stations together or the connection may be obtained by high frequency transmission or carrier current without the necessity of separate auxiliary wires.

My invention will be better understood from the following description when considered in connection with the accompanying drawings and its scope will be pointed out in the appended claims.

In the accompanying drawings, Fig. 1 illustrates diagrammatically an embodiment of my invention in a sectionalized electric line which is shown single-phase for the sake of clearness and Fig. 2 illustrates diagrammatically an embodiment of my invention as applied to a section of an electric system including two parallel lines.

In the embodiment of my invention shown in Fig. 1, there is illustrated a section of an electric circuit 10 which is arranged to be connected to station busses 11, 12 by suitable circuit interrupting means such as circuit breakers 13 and 14 respectively. These are shown as latched closed circuit breakers provided with trip coils 15 for controlling them in response to abnormal circuit conditions. There is provided at each station fault responsive protective relay means 16 which is arranged to control the tripping of the circuit breaker at the station and also, in accordance with my invention, the tripping of the circuit breaker at the other end or station of the section. The relay means 16 may be of any suitable type, the arrangement illustrated being intended merely as a schematic showing, for example, of a directional distance relay which has current and potential windings 17 and 18 respectively connected to be energized in accordance with a current and a voltage of the circuit 10.

In order that the tripping of the circuit breakers 13 and 14 may be effected in the shortest possible time, I provide, in accordance with my invention, a control arrangement which is under the supervision of a fault responsive relay 16 and which requires only a single channel of communication. As shown, this control arrangement includes a control relay means 19 adjacent each of the stations 11, 12 or the circuit breakers 13, 14 and a circuit including only two conductors 20, 21, the windings of the relays 19, and two sources of current 22, 23 which are connected for normally opposing electromotive forces. Each of the control relays 19 is arranged to control the energization of the trip coil 15 of the associated circuit breaker from its associated source. In order to effect the simultaneous operation of all the control relays 19 in response to which of the protective relays 16 operates first, each of these protective relays is arranged through its contacts 24 to bridge the conductors 20, 21 by completing a bridging circuit 25, such that current may flow from each of the sources 22, 23 in circuit 20, 21.

Assuming now that a fault occurs on the circuit 10 between the stations 11 and 12 and the fault is such that the protective relay 16 at station 11 is the first to operate, then this relay through its contacts 24 completes its associated bridging circuit 25. Current immediately flows through this bridging circuit from each of the sources 22 and 23 thereby energizing both of the control relays 19 substantially simultaneously. The operation of these control relays completes the circuits of the trip coils 15 of both of the circuit breakers 13 and 14 from their respective sources 22 and 23 thereby effecting the opening of both of the circuit breakers so as completely to isolate the faulty section. Similarly, if the fault were such that the protective relay 16 at station 12 were to operate first, then this relay would complete its associated bridging circuit 25 thereby affecting the energization of both of the control relays 19 and the opening of the circuit breakers 13 and 14.

It will be observed that with the electromotive forces normally opposed, as shown in the arrangement of Fig. 1, a current of steep wave front immediately passes each of the control relays 19 from the associated sources, upon the closing of the contacts 24 of a protective relay. Consequently both of these relays 19 are energized at their pick-up values with substantially no delay. This advantage would not accrue from a connection wherein the protective relay contacts 24 and the winding of the associated control relay 19 are interchanged. It will also be observed that any open circuiting of the conductors 20 and 21 allows the protective relays 16 to function in their usual independent manner to trip their associated circuit breakers.

In the embodiment of my invention shown in Fig. 2, I have illustrated a part of an electric system including two station busses 30, 31 which are interconnected by a plurality of parallel feeders 32, 33 through circuit breakers 34, 35, 36 and 37. These circuit breakers are shown for purposes of illustration as of the latched-closed type having trip coils 38.

For selectively controlling these circuit breakers so as to isolate a faulty feeder, any suitable fault responsive discriminating protective means may be employed. I have shown, for example, a balanced current or differential type wherein an overcurrent relay 39 and a directional relay 40 have their current windings connected in a current balance circuit 41 to be energized in accordance with the difference between the currents in the two lines 32 and 33.

With protective arrangements of this type, conditions may arise such that the protective relays at one station operate prior to those at the next station. Thus, if power is fed only from station bus 30 and a fault occurs on line 33 close to station bus 31, then substantially the same fault current will appear in each of the parallel lines 32, 33. Consequently, the difference between the currents in these lines at station 30 is at first very small or may even be zero and is, therefore, insufficient for the actuation of the differential relays at the station bus 30. At station bus 31, however, current flows over the line 32 to the bus 31 and in the reverse direction over the line 33 to the fault. There is, therefore, a relative reversal of the current in the line 33 and the difference between the currents in the lines 32 and 33 adjacent station bus 31 becomes, in effect, their arithmetic sum. Consequently, the differential relay means at station bus 31 will under these conditions operate first.

In order to take advantage of this quicker operation of the protective relays at one end of the lines, I have provided, in accordance with my invention, a selectively operable control means which is under the supervision of the protective relay means so as to be actuated to isolate a faulty feeder in response to the protective relay means which functions first. As shown in Fig. 2, this control means includes a control relay 42 adjacent each station, a single channel of communication shown as including only two conductors 43 and 44, a winding 45 of relay 42 and a source 46 which may be of a uni-directional type with the conductor 43 connected to an intermediate point.

For the desired selectivity or discrimination, the control relays 42 may be of a suitable double-throw type and as illustrated are of the two winding directional type, one winding 47 being connected across the associated source 46 to act as a polarizing winding while the other winding 45 is connected in series with the conductor 44. The directional winding 45 is arranged to have its energization controlled by the protective relay means 39 and 40 so as to operate the movable contact 48 selectively to control the circuit of the trip coil 38 of one or the other of the circuit breakers at the station. For this purpose, the contacts 49, 50 of the power directional relay 40 may be connected to opposite sides of the associated source 46 and in series with the overcurrent relay contacts 51 as shown. While I have shown fault responsive protective relay means for only one phase conductor of the system it will be obvious to those skilled in the art that for each phase there may be provided individual power directional and overcurrent relays, each having their own contacts paralleled and connected in series with each other or there may be provided a polyphase power directional relay and an overcurrent relay for each phase, the contacts of the latter being paralleled and connected in series with the contacts of the power directional relay.

Assuming a fault occurs on the line 33, near the station bus 31, then as previously pointed out it is possible for the protective relays 39 and 40 at this station to operate first. Under these conditions, it will be assumed that the direction of the fault current reflected in the current winding of the power directional relay 40 is such as to cause this relay to close its contact 50. The closing of this contact, together with the closing of the contacts 51 of the overcurrent relay 39, completes a circuit from the negative side of the source 46, through conductor 52, contact 50, contacts 51, conductor 53, winding 45 of the control relay 42 at station 31, conductor 43 to the positive side of the right portion of the source 46. Under these conditions the direction of the flow of current in the winding 45 is such as to cause the control relay 42 to close its contact 54 and thereby complete the circuit of the trip coil 38 of the circuit breaker 37. At the same time the contacts 49 and 51 of the power directional and overcurrent relays at the station 31 complete the circuit of the directional winding 45 of the control relay at the station 30 from conductor 53 through conductor 44, winding 45, conductor 43 to the positive side of the right portion of the source 46 in station 31. It will be observed that the directional windings 45 of the control relays 42 are thus connected in parallel with the right-hand portion of the source 46 at the station 31. The direction of the flow of the current in the winding 45 of the control relay 42 at station 30 is such as to cause this relay to close its contact 54 thereby completing the circuit of the trip coil 38 of the circuit breaker 36. Consequently, both of the circuit breakers 36 and 37 in the faulty feeder are opened substantially simultaneously in response to the protective relay means which operates first.

For a fault on the feeder 32 the power directional relay means will close its contact 49. This causes a flow of current in the directional winding 45 of the control relay 42 in a direction opposite to that just described so that the relays 42 close their contacts 55 and thereby complete the circuits of the trip coils 38 of the circuit breakers 34, 35 in the line 32.

While I have shown and described my invention in considerable detail, I do not desire to be limited to the exact arrangements shown but seek to cover in the appended claims all those modifications that fall within the true spirit and scope of my invention.

What I claim as new and desire to secure by Letters Patent of the United States, is:

1. In combination with an electric system and circuit interrupting means at each of a plurality of points thereof, means operative in response to abnormal circuit conditions for controlling said interrupting means including control relay means adjacent a plurality of said points for effecting a circuit controlling operation of the circuit interrupting means at the respective points and a protective relay means adjacent each of a plurality of said points for effecting a substantially simultaneous operation of all of said control relay means on the occurrence of abnormal circuit conditions whereby to cause a circuit controlling operation of all of the circuit interrupters in response to the protective relay means which operates first.

2. In combination with an electric system and circuit interrupting means at each of a plurality of points thereof, means operative in response to abnormal circuit conditions for controlling said interrupting means including protective relay means adjacent each of a plurality of said points, and means for effecting the substantially simultaneous opening of all the circuit interrupting means in response to the operation of the relay means which operates first including a single channel of communication between two of said points and means controlled by each of said relay means for effecting a flow of current in said channel of communication on the occurrence of abnormal circuit conditions.

3. In combination with an electric system and circuit interrupting means at each of a plurality of points thereof, means operative in response to abnormal system conditions for controlling said interrupting means including protective relay means adjacent each of a plurality of said points and means for effecting the substantially simultaneous opening of all the circuit interrupting means in response to the operation of the relay means which operates first including a circuit having only two conductors extending between two of said points and means controlled by each of said relay means for effecting a flow of current in said circuit on the occurrence of abnormal system conditions.

4. In combination with an electric system and circuit interrupting means at each of a plurality of points thereof, means operative in response to abnormal system conditions for controlling said interrupting means including protective relay means adjacent each of a plurality of said points, and means for effecting the substantially simultaneous opening of all the circuit interrupting means in response to the operation of the relay means which operates first including a circuit extending between two of said points, two sources of current connected in said circuit for normally opposing electromotive forces and means controlled by said relay means for bridging said circuit intermediate said sources of current.

5. In combination with two parallel lines and circuit interrupters at each end thereof, means for selectively controlling said interrupters to disconnect both ends of a faulty line substantially simultaneously including control relay means at each end selectively operable to control the opening of the interrupters at the respective ends and fault responsive relay means adjacent each end of the lines for selectively controlling the operation of the control relay means at both ends in accordance with which line is faulty.

6. In combination with two parallel lines and circuit interrupters at each end thereof, means for selectively controlling said interrupters to disconnect both ends of a faulty line substantially simultaneously including a double-throw control relay at each end of said lines for selectively controlling the circuit interrupters at the respective ends and balanced current protective relay means adjacent the ends of said lines for selectively controlling the operation of said control relay means.

7. In combination with two parallel lines and circuit interrupters at each end thereof, means for selectively controlling said interrupters to disconnect both ends of a faulty line substantially simultaneously including a circuit extending between the ends of said lines, means for energizing said circuit, a directional relay at each end of said lines for selectively controlling the circuit interrupters at the respective ends having a winding connected in said circuit and means for selectively controlling the direction of the current flow in said circuit including protective relay means responsive to the balance of the currents in said lines.

In witness whereof, I have hereunto set my hand this 28th day of August, 1930.

LUKE F. KENNEDY.